United States Patent Office 3,547,721
Patented Dec. 15, 1970

3,547,721
PROCESS OF MAKING A DIFFUSION UNIT
Hans-Joachim Dietzsch, Lausanne, Switzerland, assignor to Hans-Joachim Dietzsch G.m.b.H., Lausanne, Switzerland, a Swiss company
No Drawing. Filed Aug. 28, 1967, Ser. No. 663,533
Claims priority, application Germany, Sept. 2, 1966, D 50,998
Int. Cl. C09j 5/00; B01d 31/00
U.S. Cl. 156—155                                    13 Claims

ABSTRACT OF THE DISCLOSURE

Capillary tubes are prepared by first coating auxiliary capillary tubes, sealing the coated auxiliary tubes in the respective apertures in the plates and then dissolving out the auxiliary capillary tubes to leave the coatings, suitably hardened, to form capillary membranes in the form of open tubes.

BACKGROUND OF THE INVENTION

This invention relates to exchanger and diffusion units, particularly to exchanger and diffusion units having capillary tubes, in which the walls of the tubes perform the function of membranes, and to methods of manufacturing such units.

Exchanger and diffusion units having a plurality of spaced apart parallel capillary tubes are required, for example, for the dialysis of blood, in which case the blood flows within the capillary tubes and the dialysing fluid flows through the intercapillary spaces. For the application of such units as "artificial kidneys" for example, the walls of the capillary tubes may be produced from cellulose hydrate.

Until now two main problems were still to be solved for the production of such units. The first problem was to provide thin-walled capillary tubes of very small inside diameter from suitable membrane materials having the desired characteristics. (For artificial kidneys, for example, the wall thickness should be below 25 microns and the internal diameter of the tubings less than 1 mm.)

The second problem was to fit and seal the thin-walled capillary tubes in apertures of supporting plates of the unit without damaging the tubes.

An object of the present invention is to provide a solution to the above problems.

SUMMARY OF THE INVENTION

According to the present invention there is provided a method of manufacturing an exchanger and diffusion unit including the steps of applying a coating to a plurality of auxiliary capillary tubes, locating each coated auxiliary capillary tube in apertures in spaced apart plates of the unit, sealing the coating of each coated auxiliary capillary tube to the walls of said apertures associated with said tube, dissolving and removing said auxiliary capillary tubes to thereby leave a plurality of capillary membranes in the form of open tubes seated to and joining said spaced apart plates.

Also according to the present invention there is provided an exchanger and diffusion unit including two spaced apart plates, each plate having a plurality of apertures, a capillary membrane associated with each aperture of each plate and extending in an aperture in the other plate, the outer surface of each capillary membrane being sealed to the walls of apertures associated therewith, wherein each capillary membrane is an open tube and is formed as a coating on an auxiliary capillary tube which has been removed.

By means of this solvent flushing operation, being a part of the process of the invention, safe conditions can be provided by using the mechanical stability of the auxiliary capillary tubes in order to achieve efficient fitting and sealing of the open ends of the tubes into the provided apertures in the plates, without risking any damage to the thin-walled capillary membranes serving the required dialysis or diffusion functions. It is understood that the walls of the auxiliary capillary tubes before removal can be considerably thicker than the walls of the actual working capillary membranes.

The auxiliary capillary tubes may be made of thermoplastics materials using a melt-spinning process, a technique well known in the art.

DETAILED DESCRIPTION OF THE INVENTION

Example

A hollow tubing of polystyrene of 0.5 mm. O.D. and 80 microns wall thickness is passed through a bath of a collodion solution in an ethanol-ether mixture and dried after being thus coated. This coated layer is then denitrated using a sodium hydrogen sulphate while still remaining as a coating layer on the outer surface of the auxiliary capillary tube.

This surface helps to obtain sufficient mechanical stability during the denitration process even if the first collodion coating only represents an extremely thin wall of the capillary membrane of approximately 5 microns.

The coating process, as described above (in the example using a collodion solution) as well as the drying and aftertreatment (in the example denitration) can be repeated consecutively several times in order to build up a multiple layer coating applied to the outside wall of the auxiliary capillary tubes.

The following procedures should also be mentioned as additional examples. Coating of an auxiliary capillary tube using an ammoniacal copper hydroxide solution which is well known to form cellulose hydrate using a suitable acid bath treatment or, as a further example, using a solution of siliconrubber to which the essential hardening media and solvents have been added. After drying and the intended hardening by chemical reaction a polymerized siliconrubber skin is produced on the outer wall surface of the auxiliary capillary.

The inner diameter of each of the apertures in the plates of the unit is larger than the outer diameter of each respective combined capillary consisting of the auxiliary capillary and the coating which is to form the membrane. Each combined capillary is joined and sealed to the inner walls of the respective apertures in the plates by means of imbedding compounds lending themselves to casting or spreading methods of application, as for example hardening casting resins or silicon-rubber compounds. During the feeding-in operation the combined capillary tubes can be handled quite rigidly, for example by using forceps like tools, due to the sufficient mechanical support guaranteed by the auxiliary capillary tubes. After the hardening of the imbedding media the capillary tubes are in no way exposed to further mechanical stress which fact at this stage therefore allows to start the afore mentioned separating process of dissolving the auxiliary capillary tubes safely out, using a specific organic solvent for intracapillary radial cleansing. In the case of the first quoted example, using polystyrene, chlorinated hydrocarbon solvents may be used.

A preliminary condition in the sense of the invention is of course the necessity that for the coating and dissolving out operations the solubility of the substances used for the auxiliary capillary tubes is different, at least in relation to some solvents, to the solubility characteristics of the substances forming the required capillary membranes. Collodion, for example, is dissolved in ethanol-ether mixtures, which however do not affect polystyrene, whereas the cellulose hydrate formed by denitration is insoluble in organic hydrocarbon solvents contrary to polystyrene.

Finally, it should be mentioned that the physical or chemical final treatment of the capillary membranes, originally formed by coating operations, may take place after fitting and sealing of the combined capillary tubes in the repsective apertures of the end plates and that this final stage of processing can be applied before or after the removal of the auxiliary capillary tubes as described.

I claim:

1. A process for manufacturing a thin-walled capillary tube, comprising the steps of applying at least once to the outer surface of an auxiliary capillary tube a solution of a member selected from a film-forming, diffusable or heat-transmitting coating substance and a starting substance convertible to such coating substance in a first solvent therefor not dissolving said auxiliary capillary tube, applying said solution in a sufficient amount to produce an uninterrupted tubular membrane of said member on said auxiliary capillary tube, applying to the auxiliary capillary tube a second solvent which does not dissolve said membrane and being capable of penetrating into the inner capillary of said auxiliary capillary tube, applying said second solvent in a sufficient amount to entirely dissolve intracapillarily and radially said auxiliary tube while leaving said tubular membrane intact, and in the case of said membrane consisting of said starting material, converting the latter to said substance.

2. The process as claimed in claim 1, wherein said auxiliary capillary tube is spun from a melt of a substance spinnable in capillary form.

3. The process as claimed in claim 1, wherein said solution is a solution of collodion in an ethanol/ether mixture, and wherein the tubular membrane formed is subsequently dried.

4. The process as described in claim 1, wherein said solution is a solution of collodion in an ethanol/ether mixture, and wherein the tubular membrane formed is subsequently denitrated to form cellulose hydrate.

5. The process as described in claim 1, wherein said solution is a solution of silicone rubber containing hardening agent, and wherein the tubular membrane of silicone rubber is subsequently hardened.

6. The process as claimed in claim 1, wherein said auxiliary capillary tube is spun from the melt of a spinnable thermoplastic resin.

7. The process as claimed in claim 6, wherein said solution is a cellulose ammoniacal copper hydroxide solution and wherein the initially formed tubular membrane is converted to cellulose hydrate by treating the same with an acid bath.

8. The process as claimed in claim 6, wherein said resin is polystyrene spinnable in capillary form.

9. The process as described in claim 8, wherein said second solvent is a chlorinated hydrocarbon solvent capable of dissolving polystyrene.

10. A method of manufacturing an exchanger and diffusion unit, comprising the steps of passing a plurality of auxiliary capillary tubings through a solution of a member selected from a film-forming, diffusable or heat-transmitting coating substance and a starting substance convertible to such coating substance, in a first solvent which does not dissolve said auxiliary capillary tubings, a sufficient number of times to form an uninterrupted tubular membrane of said member on each of said tubings, locating each coated auxiliary capillary tubing in spaced apart plates of said unit, sealing the tubular membranes of each tubing to the wall of apertures in said plates associated with said tubing, in the case of said membrane consisting of said starting substance, converting the latter to said coating substance, and introducing a second solvent capable of penetrating into the capillaries of said auxiliary tubings, and of dissolving the latter but not dissolving said tubular membranes thereon, into the capillaries of said auxiliary tubings in sufficient amount to entirely dissolve intracapillarily and radially the auxiliary tubings while leaving the tubular membranes intact.

11. The method according to claim 10, wherein the tubular membrane is applied in successive layers.

12. The method according to claim 10, wherein each auxiliary capillary tube is made of a thermoplastics material, said coating substance is cellulose hydrate and each said auxiliary capillary tube is removed by means of an organic hydrocarbon solvent.

13. The method according to claim 12, wherein the thermoplastics material is melt-spun.

References Cited

UNITED STATES PATENTS

| | | | |
|---|---|---|---|
| 1,631,071 | 5/1927 | Snelling | 264—166 |
| 1,713,679 | 5/1929 | Snelling | 264—166 |
| 2,285,502 | 6/1942 | Dreyfus | 18—58 |
| 2,485,798 | 10/1949 | Whyte et al. | 264—317 |
| 2,972,349 | 2/1961 | Dewall | 210—32X |
| 2,976,576 | 3/1961 | Wichterle et al. | 18—58 |
| 3,198,865 | 8/1965 | Porter et al. | 264—317X |
| 3,228,877 | 1/1966 | Mahon | 210—321X |
| 1,876,229 | 9/1932 | Herzog et al. | 264—317X |

REUBEN FRIEDMAN, Primary Examiner

F. A. SPEAR, JR., Assistant Examiner

U.S. Cl. X.R.

156—294; 210—321; 264—317